United States Patent [19]

Joyama et al.

[11] Patent Number: 4,928,590
[45] Date of Patent: May 29, 1990

[54] NUTCRACKER

[75] Inventors: Norio Joyama; Ikumi Aoki, both of Kawasaki, Japan

[73] Assignee: Meiji Seika Kaisha, Ltd., Tokyo, Japan

[21] Appl. No.: 265,994

[22] Filed: Nov. 2, 1988

[30] Foreign Application Priority Data

Nov. 6, 1987 [JP] Japan .......................... 62-168966[U]

[51] Int. Cl.$^5$ .............................................. A23N 5/00
[52] U.S. Cl. ...................................... 99/576; 99/574; 99/581
[58] Field of Search ............................ 99/568, 574–576, 99/581, 582, 584, 585, 588, 590, 591, 593, 594, 621, 623, 624; 426/482, 483; 241/187, 230, 286, 235; 30/120.1, 120.2

[56] References Cited

U.S. PATENT DOCUMENTS 632,216  8/1899  Claughton ............................ 99/575

FOREIGN PATENT DOCUMENTS 1242155  4/1960  France .................................. 99/575

Primary Examiner—Timothy F. Simone
Attorney, Agent, or Firm—Armstrong, Nikaido, Marmelstein, Kubovcik & Murray

[57] ABSTRACT

Disclosed is a nutcracker comprising at least one rotary disk with sharp teeth on its circumference blade, and a stator plate with sharp teeth on its curved blade, said stator plate being positioned with its curved blade in confronting relation with the rotary disk blade, leaving the gap between the curved blade and the disk blade, setting narrower downstream.

3 Claims, 2 Drawing Sheets

NUTCRACKER

BACKGROUND OF THE INVENTION

1. Field of the Invention

The present invention relates to an apparatus for cracking nuts, particularly nuts in the seamless shell such as macadamia nuts and separating them into edible kernels and woody shells.

2. Related Art

A conventional nutcracker is disclosed for instance in Japanese Patent Application Public Disclosure No. 56-75089. FIG. 7 shows such a nutcracker as comprising as electrically driven conveyer 1 for transporting nuts, a hydraulic press comprising cylinders 2 and 3 with their piston blades 4 and 5 arranged in confronting relation, and different sensors 6 and 7. These piston blades 4 and 5 are designed to come close and separate apart from each other to crack nuts and remove their edible kernels and woody shells. The nutcracker uses hydraulic and electric control systems, and is automatized as much as possible. In operation the electrically driven conveyer 1 transports nuts to the cracking station where nuts are caught and cracked by the hydraulic piston blades 4 and 5. Different units of the cracking apparatus are responsive to signals from associated sensors as indicated at 6 and 7 to coordinate their operations. The structure of the cracking apparatus is complicated. The reciprocation operation of the hydraulic press, however, dose not permit continuous cracking, and therefore it cannot work with and increased efficiency.

SUMMARY OF THE INVENTION

In view of the above one object of the present invention is to provide a nutcracker which is simple in structure, and can crack the shell of nuts with an increased efficiency.

To attain this object a nutcracker according to the present invention comprises at least one rotary disk having indentations on its circumference; a stator plate having indentations on its curved surface, said stator plate being positioned with its curved surface in confronting relation with the rotary disk and extending along a predetermined arc of the disk circumference, leaving the gap between the curved surface and the disk circumference, getting narrower downstream; and a dispensing inclination for dispensing nuts to the tapering gap between the curved surface and the disk circumference.

According to preferred embodiment said indentations are V-shaped notches made on the circumference of said rotary disk and the curved surface of said stator plate. The indentations on the circumference of the rotary disk may be in the form of top-flattened triangular teeth, and the top angle of each triangle may be preferably about 80 degrees.

Other objects and advantages of the present invention will be understood from the following description of a preferred embodiment, which is shown in the accompanying drawings.

PREFERRED EMBODIMENT OF THE INVENTION

Figure 1:
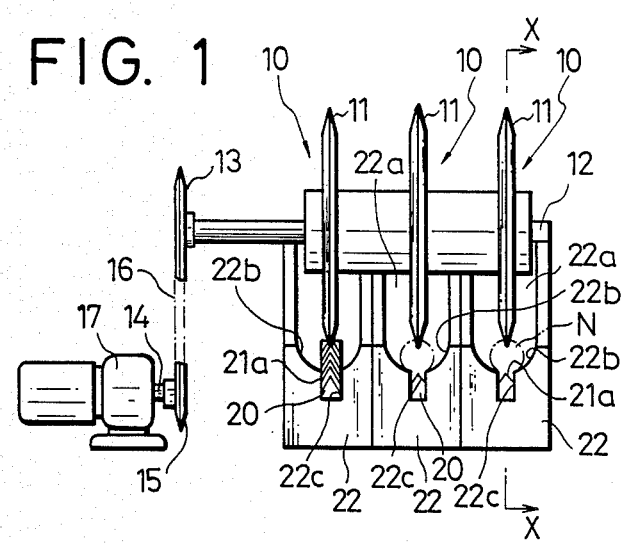
FIG. 1 is a front view of the main part of a nutcracker according to a preferred embodiment of the present invention.
Figure 2:
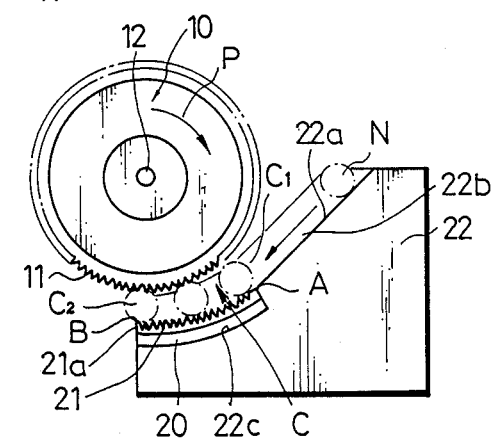
FIG. 2 is a sectional view of the main part of the nutcracker taken along the line X—X in FIG. 1 and seen in the direction indicated by arrows.
Figure 3:
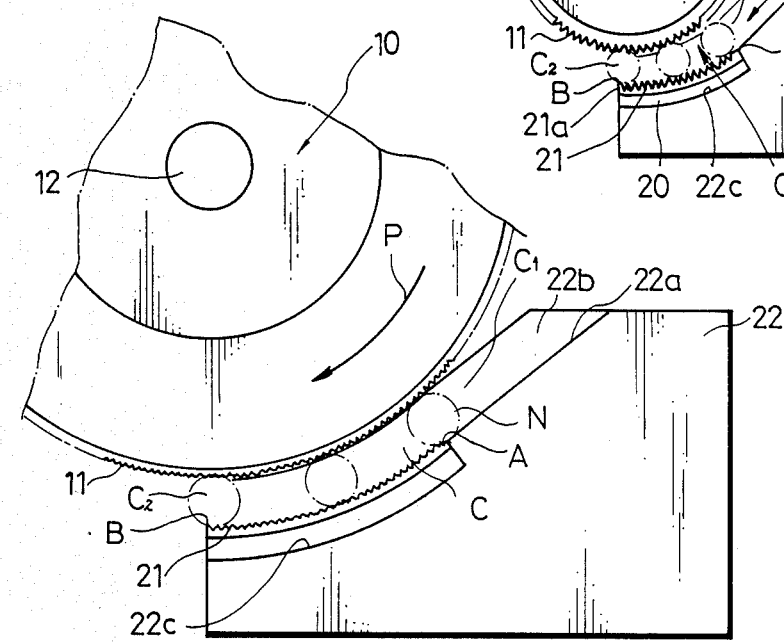
FIG. 3 is an enlarged fragmental view of the main part of FIG. 1.

Referring to FIGS. 1 to 3, there is shown a nutcracker according to one embodiment of the present invention. As shown, it comprises three rotary disks 10 each having a circumferential blade with sharp triangular teeth 11, three stator plates 20 having a blade with sharp triangular teeth 21 made on its curved surface. Each stator plate 20 is positioned with its curved surface in confronting relation with an associated rotary disk 10 and extending along a predetermined arc of the disk circumference, leaving the gap C between the curved surface and the disk circumference, getting narrower downstream. A dispensing inclination 22 extending from each stator plate has a slant 22a for dispensing nuts N to the tapering gap C between the curved surface and the disk circumference. With this arrangement nuts N are allowed to roll down until they are caught in the tapering gap at different places where each nut fits the gradually decreasing gap, and then they are cracked under pressure by the rotary disk 10. As shown, each rotary disk 10 has a plurality of triangular teeth 11 on its circumference. The rotary disks are fixed to a common shaft 12 at regular intervals, and the shaft 12 is rotatably supported by bearings (not shown), which are fixed to a frame (not shown). The shaft 12 has a relatively large sprocket 13 at its free end, and the shaft of an electric motor 17 has a relatively small sprocket 15. These sprockets 13 and 15 are connected by a power chain 16. The rotary disks 10 will be rotated in the direction as indicated by arrow P.

Figure 5:
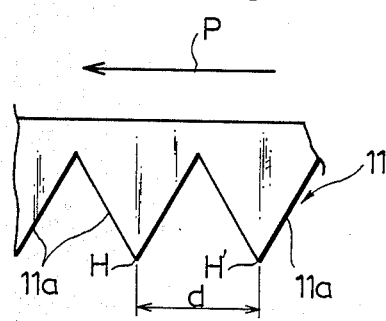
FIG. 5 is an enlarged side view of a fragment of the rotary disk, showing the V-shaped teeth.
Figure 6:
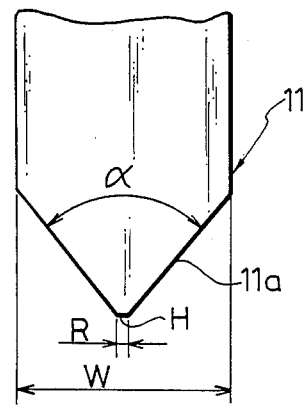
FIG. 6 is an enlarged front view of a single V-shaped tooth.
Figure 7:
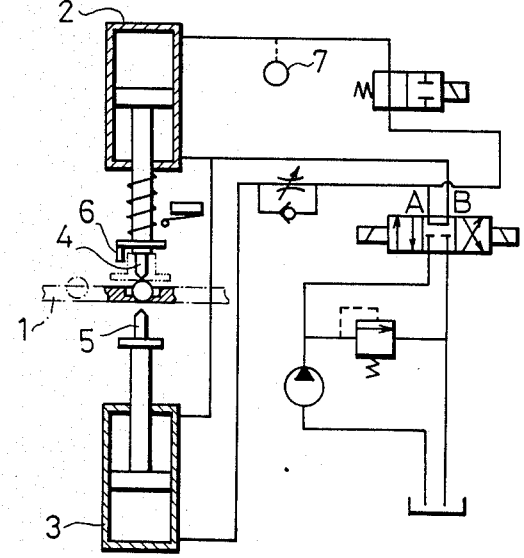
FIG. 7 is a schematic view of a conventional nutcracker.

As shown in FIG. 5, a plurality of V-shaped notches are made on the circumference of the rotary disk to leave a corresponding number of triangular teeth 11a. Preferably, these teeth are arranged at regular top-to-top intervals "d" of approximately 4.5 mm. Each tooth 11a has a flattened top "R" about 0.2 mm long, the flat top surface being laid in the direction in which the rotary disk is rotated. The top angled of each triangle is about 80 degrees. The thick W of teeth are about 6 mm.

Each stator plate 20 is mounted to an associated block 22. As described above, it has a plurality of V-shaped teeth 21a on its arc blade. The stator plate 20 is positioned with its blade in confronting relations with the circumference blade of the rotary disk, leaving the gap C tapering downward. As shown, the stator plate 21 has a blade with sharp triangular teeth 21a of the same shape and size as the triangular teeth 11 of the blade of the rotary disk 10.

Each block 22 has a semicircular cut 22b in its upper surface. As seen from FIG. 1, a square groove 22c is made in the bottom of the semicircular cut 22b. The stator plate 20 is fixed in the groove with its teeth 21a somewhat projecting above the bottom surface level.

The diameter of the semicircular cut 22b is larger than the diameter of nut in the shell N to be dispensed. The block 22 has a slant extension 22a to allow nuts N to roll down into the tapering gap C.

The tapering gap C between the rotary disk 10 and the stator blade is at its entrance, broad enough to permit nuts in the shell N to easily enter the gap C. The gap C gradually decreases towards the exit end B of the gap C, thereby permiting nuts in the shell of somewhat different sizes to fit somewhere in the course to the exit of the tapering gap.

Figure 4:
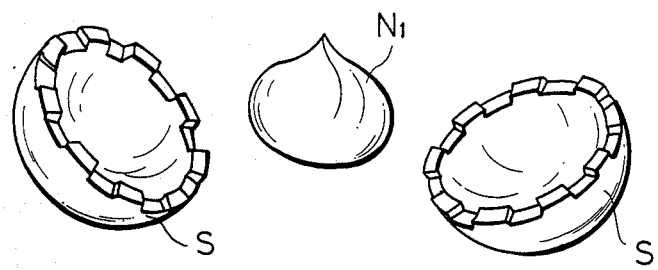
FIG. 4 shows the edible kernel and cracked woody shell.

In operation, prior to dispensing nuts N to the nutcracker a sorter (not shown) separates nuts in the shell N in different groups in terms of size. The permissible variation of nuts in the shell size is within 3 mm. The tapering gaps are allotted to these different groups of nuts. Then, nuts are put on the slant extension 22a to roll down and get in the tapering gap. As described earlier, nuts of somewhat different sizes within tolerance will fit somewhere in the course to the exit B of the tapering gap. The width of the gap becames narrower downward from its entrance A ($C_1$ wide) to exit B ($C_2$ wide). Then, each nut will be cracked to separate its edible kernel N and two broken pieces of woody shell S as shown in FIG. 4, and they are discharged from the exit end of the tapering gap C. The edible kernels and broken pieces of woody shell are separated in the subsequent station.

If the stator plate 20 had flat or wavy edge on its blade rather than sharp triangular teeth 21, and even if the rotary disk has sharp triangular teeth on its blade, edible kernels when separated from woody shells would be damaged, and woody shells would be broken in fragments, and small shell fragments would be mixed with edible kernels. If the rotary disk 12 had flat or wavy edge on its blade rather than sharp triangular teeth 11, and even if the stator plate 20 has sharp triangular teeth on its blade, the same deficiency would be caused. The sharp triangular teeth on the blade each of the stationary plate and rotary disk have an effect to separate edible kernels from woody shells without injuring kernels and breaking shells into fragments.

The embodiment described above should not be understood as limitative. It can be widely used in cracking a variety of nuts, for instance walnuts of different sizes. Sets of rotary disk-and-stationary plate as many as desired can be installed. The slant channel which extends from the semicircular cut 22b, may be square in section.

As readily understood from the above, a nutcracker according to the present invention permits beautiful separation of edible kernels and woody shells at an increased efficiency thanks to the arrangement of sharp triangular teeth on the opposite sides of the tapering gap.

We claim:

1. A nutcracker comprising:
    at least one rotary disc having indentations on its circumference;
    means for rotating said at least one rotary disc;
    a stator plate having a curved surface and further indentations formed on said curved surface, said stator plate being positioned with said curved surface in confronting relation with said rotary disc and extending along a predetermined arc of a circumference of said disc, defining a gap that progressively narrows downstream between the curved surface of said stator plate and the disc circumference, said indentations made on the circumference of said rotary disc and further said indentations on the curved surface of said stator plate being formed by teeth which are V-shaped in lateral cross-section;
    and a dispensing inclination for dispensing nuts in the shell to the narrowing gap between the curved surface of the stator plate and the disc circumference.

2. A nutcracker according to claim 1, wherein said indentations on the circumference of said rotary disk are in the form of top-flattened triangular teeth in lateral cross-section, and the top angle of each triangle is about 80 degrees.

3. A nutcracker according to claim 1, further comprising a stator block,
    said dispensing inclination comprising a semicircular channel defined in said block for guiding the flow of the dispensed nuts in their shells to the narrowing gap, said semicircular channel having a square-cut groove portion adjacent said narrowing gap, said stator plate being fixedly mounted in said square-cut groove.

* * * * *

UNITED STATES PATENT AND TRADEMARK OFFICE
CERTIFICATE OF CORRECTION

PATENT NO. : 4,928,590

DATED : May 29, 1990

INVENTOR(S) : JOYAMA et al

It is certified that error appears in the above-identified patent and that said Letters Patent is hereby corrected as shown below:

On the cover page, Item [21], "265,994" should read --265,964--.

Signed and Sealed this

Sixth Day of November, 1990

Attest:

HARRY F. MANBECK, JR.

*Attesting Officer*   *Commissioner of Patents and Trademarks*